Dec. 12, 1933.  E. J. VON PEIN  1,939,091
SCALE DEVICE
Filed July 3, 1931
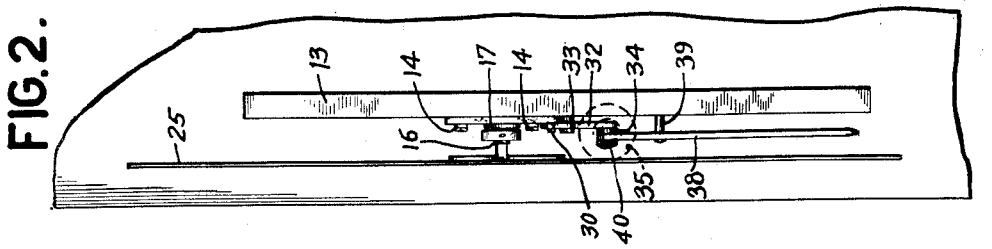
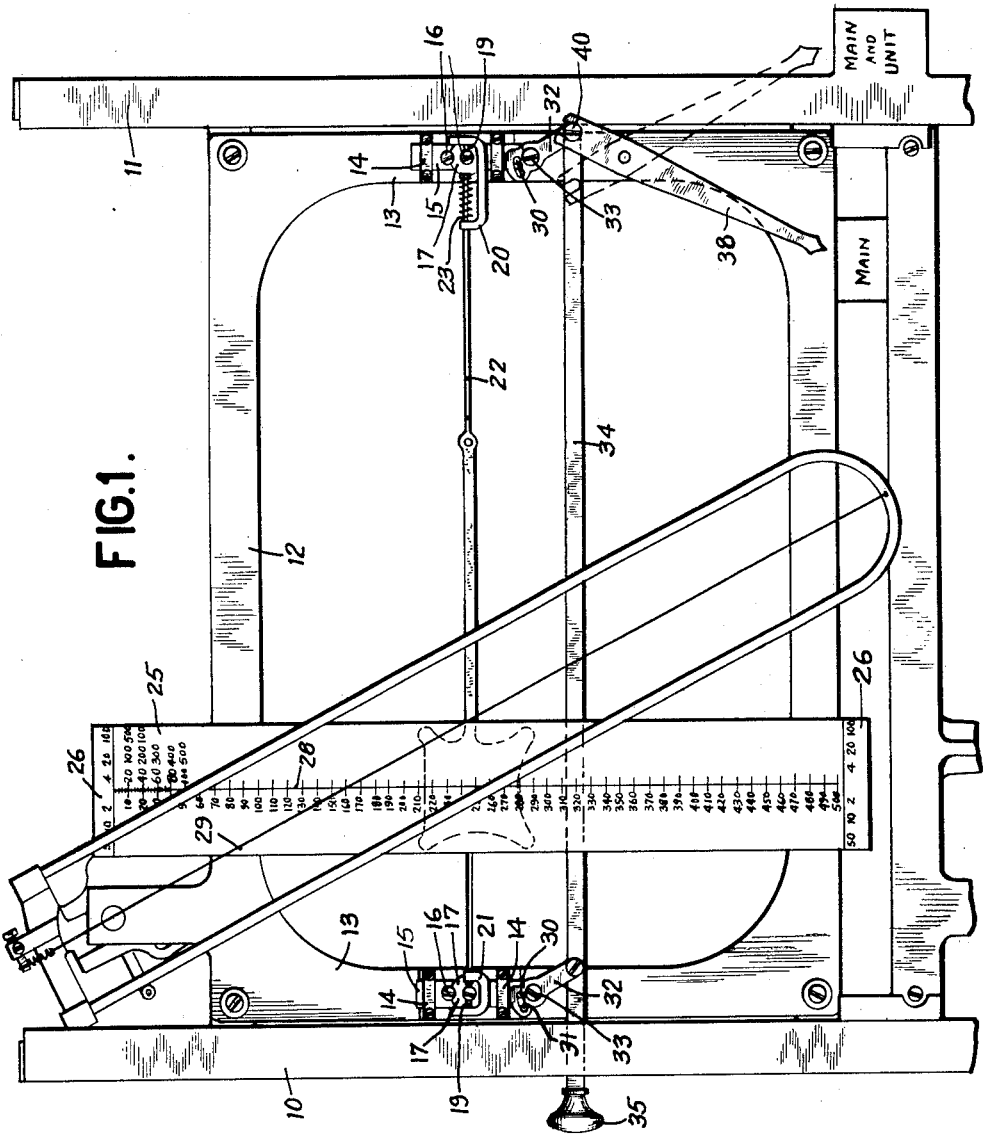
INVENTOR
E. J. Von Pein
BY his ATTORNEY Patented Dec. 12, 1933

1,939,091

UNITED STATES PATENT OFFICE 1,939,091

SCALE DEVICE

Edward J. Von Pein, Dayton, Ohio, assignor, by mesne assignments, to International Business Machines Corporation, New York, N. Y., a corporation of New York Application July 3, 1931. Serial No. 548,567

3 Claims. (Cl. 265—29)

This case relates to counting scales and particularly to the type disclosed in Patent 1,650,227 in which independently actuated chart and hair line members intersect to indicate the number of articles on a main platform. The chart is connected to the latter and is provided with several rows of figures, each row corresponding to a different number of articles in a ratio pan connected to the hair line member. In ordinary practice to obtain the total number of articles on both the main and ratio pans, the operator mentally adds the count given by the chart to the number of articles in the ratio pan. This takes time and is liable to error.

The present invention proposes to avoid possibilities of error in obtaining the total count of articles on main and ratio platforms.

Further, the invention aims at reading from the chart either total count of articles or only the count of articles on the main platform.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the drawing:

Fig. 1 is a front view of the indicator structure and

Fig. 2 is an end view of the right side of Fig. 1, with the outer adjacent frame side 11 removed.

In detail, the scale includes end frames 10, 11 carrying between them a rectangular, vertically disposed, four sided bracket 12. Attached to opposite vertical sides 13 of this bracket are upper and lower U-shaped clips 14 between which and the faces of the sides 13 short bars 15 are slidably guided for vertical movement. Attached to the bars 15 in any suitable way as by screws 16 are round members 17. One of the screws 16 is central of the member 17 and has notches in the sides in which are seated the pointed ends of studs 19. The studs are rigid with U-shaped pieces 20 and 21, slidably carrying the guide wire 22 between them. Both ends of the wire are headed to limit the slidable movement of the wire by contact with the inner legs of the pieces 20 and 21. A coil spring 23 carried by the wire 22 between its right hand end and the inner leg of piece 20 keeps the wire taut. The assembly of wire 22 and the pieces 20 and 21 is held in position by the coacting pointed studs 19 with the notches in the sides of the central screws 16.

Guided for translatory movement along the wire 22 is the counting chart 25 connected to the main platform (not shown). The chart has six rows of figures each based on a different number of units in the ratio pan, (not shown). Thus, with two pieces in the pan, the column of figures above "2" of the scale 26 is read, and so on. Only one row of figures has been fully illustrated. The space between the smallest graduations (shown at the upper end of the chart) indicates the numbers of pieces in the pan depending on which row of figures is being read. Thus for the row of figures alined with "2" of scale 26, the space between numbers "10" and "20", for example, is divided into five parts so that each part indicates "2". Similarly, each of the five spaces between graduations indicating "40" and "60" of the "4" column indicates "4".

Assuming that the unit pan contains four of the articles to be counted, the row of figures in line with "4" of the scale 26 is read at the point horizontally in line with the intersection of the index line 28 of the chart and the indicator wire 29 operatively connected to the ratio pan. The reading gives the number of pieces in the load on the main platform. To obtain the total number of pieces on both main and ratio platforms, the operator formerly had to add the count given by the chart to the number of articles in the ratio pan. Since the number of articles in the ratio pan, as explained above, is indicated for the corresponding row by the space between the smallest graduations, the addition might have been made by the operator reading the chart at a point one graduation space below intersection of the indicators. This might possibly be done without error when the indicators exactly intersect at a graduation mark but cannot be done accurately when the intersection is between graduation marks requiring interpolation. The problem is solved according to the present invention by raising the chart at will a distance equal to that between the smallest graduations. For accomplishing this, the bars 15 at the lower ends are provided with studs 30 projecting into slots 31 of members 32 pivoted by pins 33 to the vertical sides 13 of bracket 12. The slots 31 extend eccentrically of the pivot pins in a manner such that when members 32 are swung clockwise, studs 30 are forced upwardly thereby raising the bars 15, guide wire 22, and chart 25 a distance equal to that between graduations. Members 32 are pivotally connected for common operation to a rod 34 having a hand knob 35 exterior of the scale housing. The weight of the part bearing on members 32 is sufficient to swing the members back to initial position when knob 35 is released so that the normal position of the chart is the lower one for giving only the count of articles on the main platform.

When only the latter count is necessary, the chart is read in lower position. When the total count of articles on the main and unit pans is desired, rod 34 is pulled out by knob 35 and the chart raised to directly indicate the total count at the intersection of index line 28 with hair line 29.

For indicating the different positions of the chart, a pointer 38 is provided which is adapted to coact with an indication Main when the rod 34 is in normal retracted position. The pointer is pivoted at 39 to frame side 13 and is forked at its upper end to receive the pin 40 which pivotally connects rod 34 and the right hand lever 32. When the knob 35 is retracted to raise the chart 25, the pin 40 swings the pointer 38 counterclockwise to coacting position with an indication Main and unit on an extension of frame 11. The latter position of the pointer is indicated in dotted lines in Fig. 1.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. A ratio scale having an indicator and a coacting gravity-controlled movable chart bearing a row of figures indicating counts of articles based on a unit value corresponding to a definite number of the same articles, and manual means for moving said chart a predetermined amount to increase the reading on the chart by said unit value.

2. A ratio scale having an indicator and a coacting movably mounted chart bearing a row of figures indicating counts of articles based on a unit value corresponding to a definite number of the same articles, and means for moving said chart a predetermined amount to vary the reading by the indicator of said chart by said unit value.

3. A ratio scale having a chart member with several rows of figures indicating counts of articles, each row based on different unit values, an indicator member moved variably and relatively to the chart according to the different unit values to indicate counts on the chart, and a device for moving one of the aforesaid members a predetermined amount to vary the count indicated by a row of the chart member by the unit value on which said row is based.

EDWARD J. VON PEIN.